UNITED STATES PATENT OFFICE.

CHARLES HERSCHEL KOYL, OF NEW YORK, N. Y.

PROCESS OF PURIFYING WATER.

SPECIFICATION forming part of Letters Patent No. 677,668, dated July 2, 1901.

Application filed December 15, 1900. Serial No. 39,990. (No specimens.)

*To all whom it may concern:*

Be it known that I, CHARLES HERSCHEL KOYL, a citizen of the United States, and a resident of New York city, in the county and State of New York, have invented a certain new and Improved Process for the Purification of Water, of which the following is a specification.

In Letters Patent No. 653,008, granted to me July 3, 1900, I have described and claimed a process of treating water for purposes of purification, which consists in first preparing the water by intimately mixing with it sodium hydroxid or sodium hydrate and then adding to the thus-prepared water ferrous sulfate (or aluminium sulfate.) My invention is an improvement on said patented process. That process is entirely satisfactory for the treatment of most waters; but there are some waters which contain in solution free carbonic-acid gas, and the process when used in connection with these waters does not give such satisfactory results unless the sodium hydrate is used in excess, for the reason that the free carbonic-acid gas in the water unites with the sodium hydrate used in the process to form sodium bicarbonate, and the sodium bicarbonate reacts with the subsequently-added ferrous sulfate to form soluble bicarbonate of iron. The presence of sodium bicarbonate is objectionable, because it remains dissolved in the water and has a tendency to make boiler-waters foam. The presence of soluble bicarbonate of iron is objectionable, because upon long standing it loses part or all of its carbonic-acid gas ($CO_2$) and is deposited as basic ferric carbonate or as the hydrated oxid of iron.

It is the object of my improvement to extract the free carbonic-acid gas from such waters before it has the opportunity to act upon the sodium hydrate and at the same time to preserve the proper amount of sodium hydrate to combine with the ferrous sulfate, as in my said patented process.

I have found that the free carbonic-acid gas can be extracted from the water to be treated by the action of lime-water, [$Ca(OH)_2$.] Sodium hydrate can be produced by the union of lime-water with its equivalent of sodium carbonate. I avail myself of these facts to effectuate the object I have in view by adding to the water to be treated lime-water and sodium carbonate in the order named, so that the sodium hydrate shall be produced or created in the water to be treated, the reagent lime-water first introduced being in such quantity that after its union with all the free carbonic-acid gas in the water there shall still remain of it an excess sufficient to combine with the sodium carbonate subsequently introduced to produce in the water the amount of sodium hydrate needed to combine with the ferrous sulfate when the latter is introduced to produce the flocculent precipitate of my patented process. It is this feature that characterizes my improvement.

In carrying out my improvement I proceed as follows: I provide the three reagents—lime-water, sodium carbonate, and ferrous sulfate, (or the equivalent, aluminium sulfate.) I first thoroughly mix with the raw water a definite amount of lime-water. Then I add and thoroughly mix with the water a definite amount of sodium carbonate. Then I add and thoroughly mix with the water a definite amount of ferrous sulfate or aluminium sulfate. This succession of independent mixings I accomplish by means of the apparatus shown in my Patents Nos. 653,009 and 653,010, of July 3, 1900, or by any other suitable means. The reactions which take place are as follows: Upon introduction of the lime-water the free carbonic-acid gas ($CO_2$) in the raw water unites with its equivalent of lime-water [$Ca(OH)_2$] to form calcium carbonate, ($CaCO_3$,) which is insoluble and settles as a precipitate. Then when the sodium carbonate is added the balance of the lime-water [$Ca(OH)_2$] goes on to meet its equivalent of sodium carbonate, ($Na_2CO_3$,) with which it combines to form calcium carbonate ($CaCO_3$) and sodium hydrate, ($NaOH$,) the former being insoluble and settling as a precipitate, the latter remaining in solution in the water. Finally, when the ferrous sulfate is introduced, the sodium hydrate ($NaOH$) thus formed goes on with the water, to meet its equivalent of ferrous sulfate ($FeSO_4$) or aluminium sulfate, with which it combines to form sodium sulfate ($Na_2SO_4$) and ferrous hydrate [$Fe(OH)_2$] or aluminium hydrate, the sodium sulfate remaining dissolved in the water and the ferrous hydrate or aluminium hydrate being insoluble and settling as a precipitate. The ferrous hydrate absorbs oxygen rapidly from the water, and is thus converted into insoluble ferric hydrate, which (or aluminium hydrate, if aluminium sulfate be used) is the flocculent precipitate for the production of which the aforesaid patented process is designed.

The proportions as well as the absolute amounts of the chemical reagents used will of course depend largely upon the quality and character of the particular water to be treated and will vary as those waters vary from one another. By way of example I may say that in the case of one water which I have successfully treated I use per gallon of water: calcium hydrate [$Ca(OH)_2$] as lime-water, 2.775 grains; sodium carbonate, ($NaCO_3$,) 1.324 grains; crystallized ferrous sulfate, ($FeSO_4-7H_2O$,) 3.500 grains.

Having described my improvement and the manner in which the same is to be carried into effect, what I claim herein as new and of my own invention, and desire to secure by Letters Patent, is—

The improved process of treating, for purposes of purification, water containing free carbonic-acid gas in solution, which consists in preparing the water by intimately mixing it with lime-water in excess of what is required to unite with the free carbonic-acid gas, and next with sodium carbonate to unite with the excess of lime-water, and then adding to the thus-prepared water ferrous sulfate, substantially as and for the purposes hereinbefore set forth.

In testimony whereof I have hereunto set my hand this 14th day of December, 1900.

CHARLES HERSCHEL KOYL.

Witnesses:
HENRY BEYER,
HARRY H. SUTRO.